United States Patent [19]

Chen

[11] Patent Number: 4,994,929
[45] Date of Patent: Feb. 19, 1991

[54] AUTOMATIC VIDEO TAPE CONVERTING DEVICE

[76] Inventor: Stephen Chen, No. 52, Lane 563, Chang Tsao Road, Changhua Hsien, Taiwan

[21] Appl. No.: 427,424

[22] Filed: Oct. 27, 1989

[51] Int. Cl.⁵ .................... G11B 15/665; G11B 23/08
[52] U.S. Cl. .................................. 360/94; 360/96.5; 360/132
[58] Field of Search .............. 360/94, 96.5, 93, 95, 360/132; 242/200

[56] References Cited

U.S. PATENT DOCUMENTS

| 4,476,505 | 10/1984 | Ogata et al. | 360/94 |
| 4,479,618 | 10/1984 | Okada et al. | 366/94 X |

FOREIGN PATENT DOCUMENTS

| 55-45172 | 3/1980 | Japan | 360/94 |
| 58-53064 | 3/1983 | Japan | 360/94 |
| 58-175177 | 10/1983 | Japan | 360/94 |
| 58-212668 | 12/1983 | Japan | 360/94 |

Primary Examiner—John H. Wolff
Attorney, Agent, or Firm—Browdy and Neimark

[57] ABSTRACT

An automatic video tape converting device capable of converting camera-used video tape into general video tape suitable for common video player to play, wherein a pair of corresponding guide grooves are formed on a box body for a drive cover having a rack portion to slidably associate with, winding mechanism and left and right arm members and fixing blocks being disposed in the box body, whereby when the video tape is placed therein, the drive cover can move forward or backward to push the winding mechanism and outward swing the left and right arm members, making the same fixedly located by the fixing blocks, or to make the winding mechanism reversely wind the tape member of video tape thereinto.

2 Claims, 3 Drawing Sheets

AUTOMATIC VIDEO TAPE CONVERTING DEVICE

BACKGROUND OF THE INVENTION

In general, common camera-used video tape is smaller than normal video tape in length, width and height. Therefore, a special video tape player must be used to display the content of the video tape, and the most general domestic VHS and Beta video tape players can not be employed to do so. Thereby, the content of a camera-used video tape must be re-recorded on general video tape to meet the requirement of common video player and this causes a lot of inconvenience.

Some have practitioners have developed various video tape changing or converting devices which can convert smaller video tape into the larger tape, wherein a power system is provided to displace and locate the tape member to cooperate with the video magnetic head for display. However, since the video tape converting device must be placed into the video player when played, the power system can not be connected to an external power source. As a result, dry cell batteries are applied to serve as the power supply. Accordingly, the dry cell batteries appear to be indispensable when the device is used. Moreover, the structure of the device is quite complicated and the manufacturing cost is relatively high. Therefore, the current video tape changing device is impractical and not economical to the consumer and manufacturer.

SUMMARY OF THE INVENTION

It is therefore a primary object of the present invention to provide an automatic video tape changing or converting device requiring no power supply, wherein by means of pushing a drive cover when mounting and removing the video tape, the video tape is automatically changed to meet the requirements of common video player so as to eliminate inconvenience and high cost existing in prior art.

The present invention can be best understood through the following description and accompanying drawings wherein:

DETAILED DESCRIPTION OF THE PREFERRED EMBODIMENT

Figure 1:
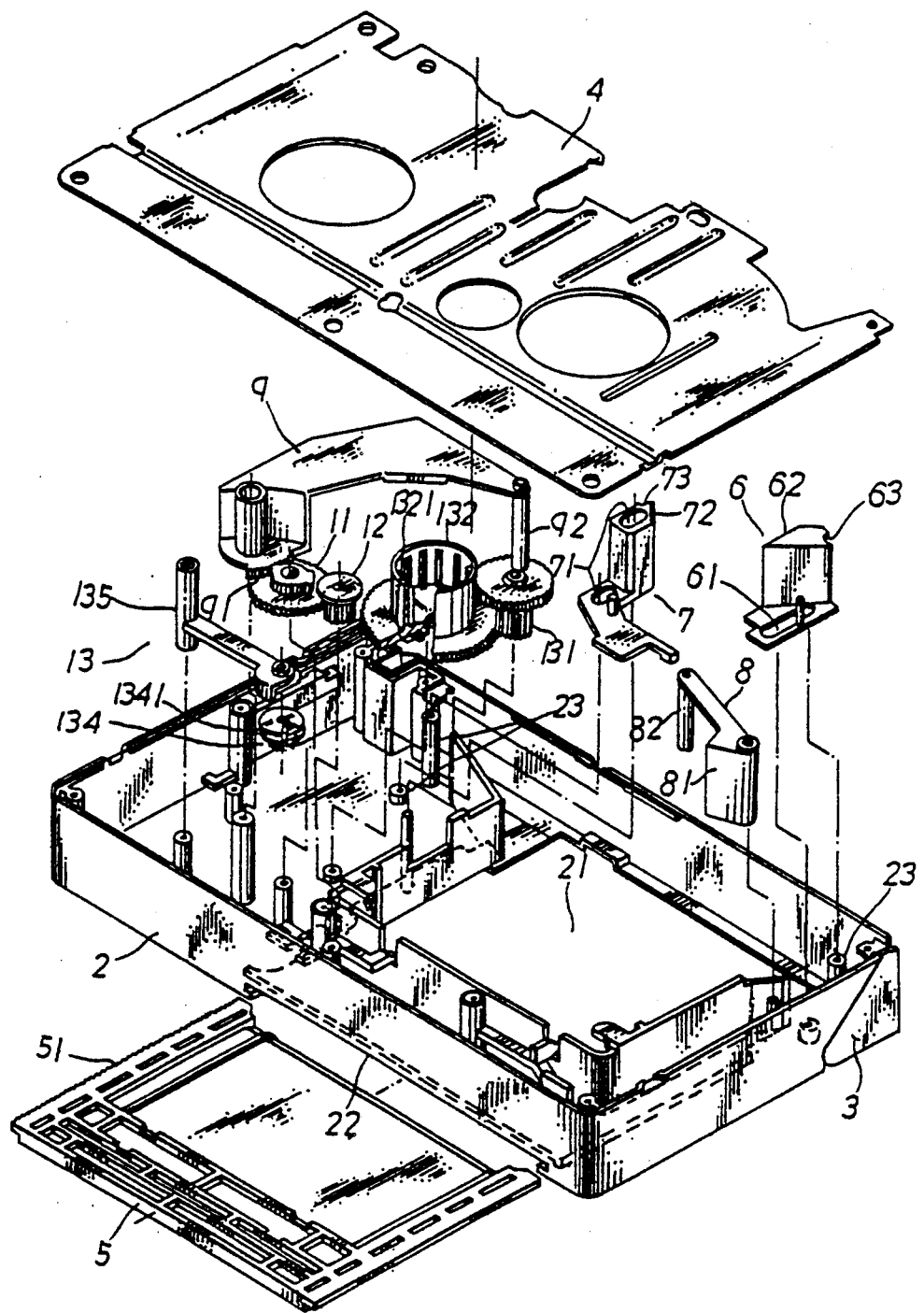
FIG. 1 is an exploded view of the present invention, showing the back side thereof
Figure 2:
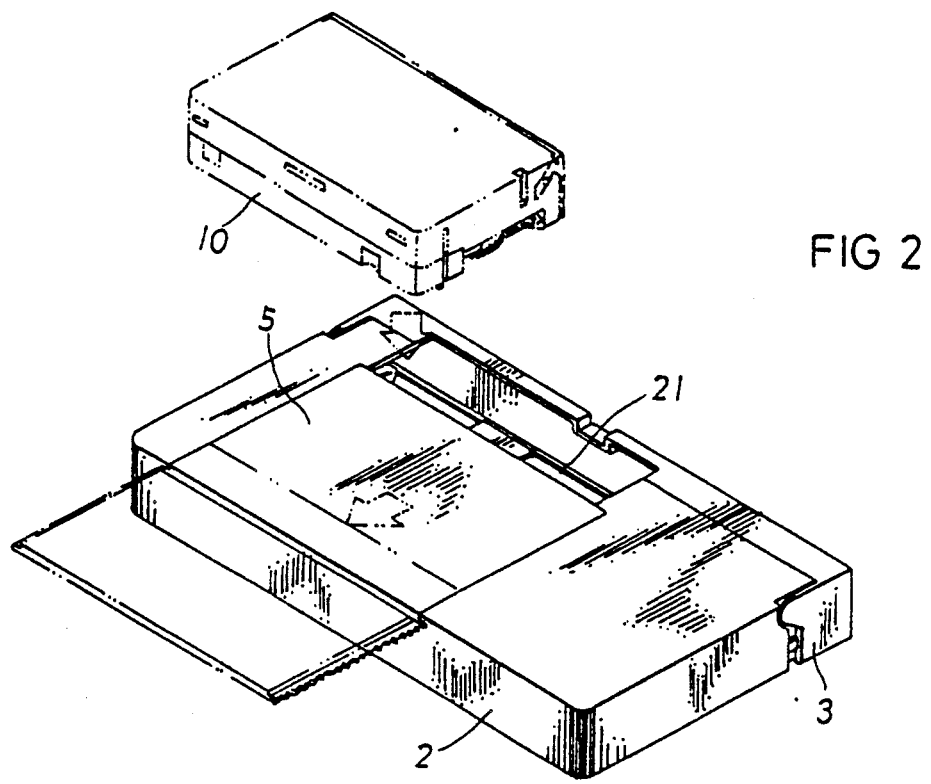
FIG. 2 is an assembled view of the present invention, showing the front side thereof.

Referring to FIG. 1, the present invention includes a video tape changing box body 2 having a pivotable front cap 3, a bottom cover 4 and an upper opening 21 through which a camera video tape 10 can be placed into the box body 2 (as shown in FIG. 2). On two sides of the opening 21 are respectively disposed two corresponding guide grooves 22 into which a drive cover 5 having a rack portion 51 on one side can be slidably fitted so as to open or close the opening 21. Two pairs of guide posts 23 are respectively disposed on front left and front right sides of the box body 2 so that a pair of left and right fixing blocks 6, 7 having guide holes 61, 71 respectively can engage therewith, and by means of extension springs S1, S2, the fixing blocks 6, 7 are restricted to move forward and backward automatically. Slant guide faces 62, 72 are formed on left and right fixing blocks 6, 7, and fixing grooves 63, 73 are formed behind the guide faces 62, ,72. A left arm member 8 is pivoted to the box body 2 behind the left fixing block 6, and a drive face 81 is formed on the left arm member 8 for the drive cover 2 to push so as to fixedly locate a shaft rod 82 pivoted to the left arm member 8 into the fixing groove 63 of the fixing block 6. A right arm member 9 having lower fan tooth portion 91 is pivoted to the box body 2 behind the right fixing block 7. A shaft rod 92 is pivoted to front end of the right arm member 9. The shaft rod 92 can be fixedly located in the fixing groove 73 of the right fixing block 7. A first drive gear 11 having a semicircular tooth portion 111 engaged with the fan tooth portion 91 of right arm member is pivoted to the box body 2. The first drive gear 11 is engaged with a first idle gear 12 which in turn meshes with the rack 51 of drive cover 5, whereby the drive cover 5 can move and urge the first idle gear 12, first drive gear 11 to swing the right arm member 9. A winding means 13 has a second idle gear 131 meshing with a second drive gear 132 which is equipped with a pulley 1321 for a belt 133 to associate with. The belt 133 also associates with a pulley 1341 of a third drive gear 134 which is pivoted to one end of a clutch rod 135 and engages with the rack 51 of the drive cover 5. The other end of the clutch rod 135 is pivoted to the box body 2, whereby when the drive cover 5 moves forward, the clutch rod 135 and third drive gear 134 are together moved forward to loosen the belt 133 and the second drive gear 132 is thus not rotated thereby. When drive cover 5 moves backward, the belt 133 is tightened by the third drive gear 134 and clutch rod 135 so as to make the second drive gear 132 and second idle gear 131 rotate together.

Figure 3:
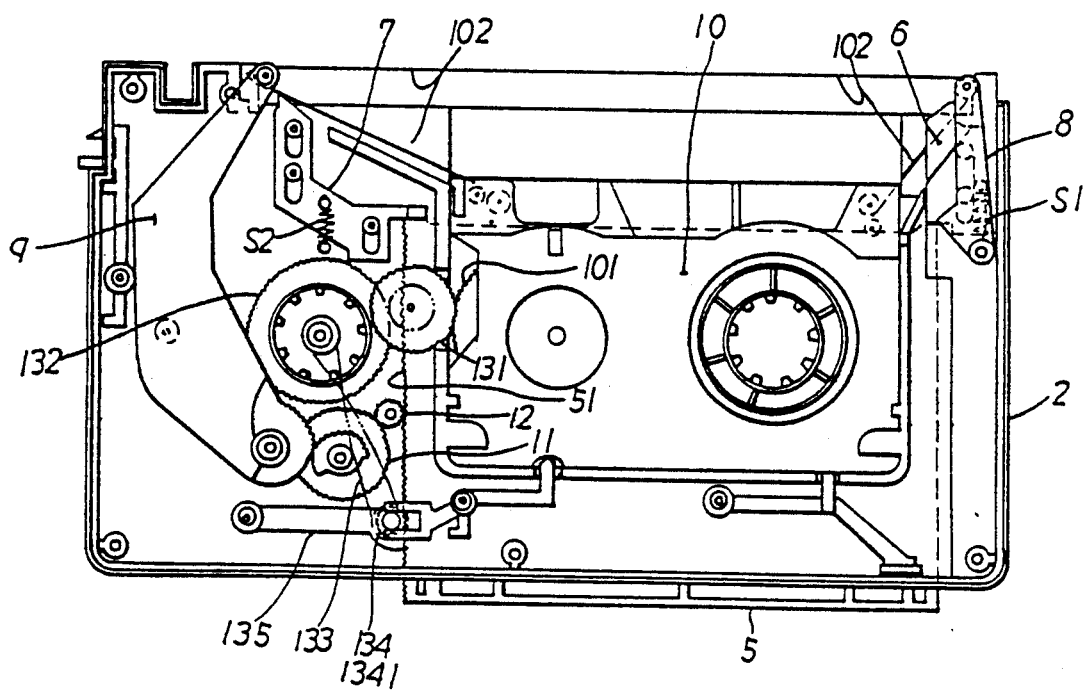
FIG. 3 illustrates the video tape mounting and changing procedure.
Figure 4:
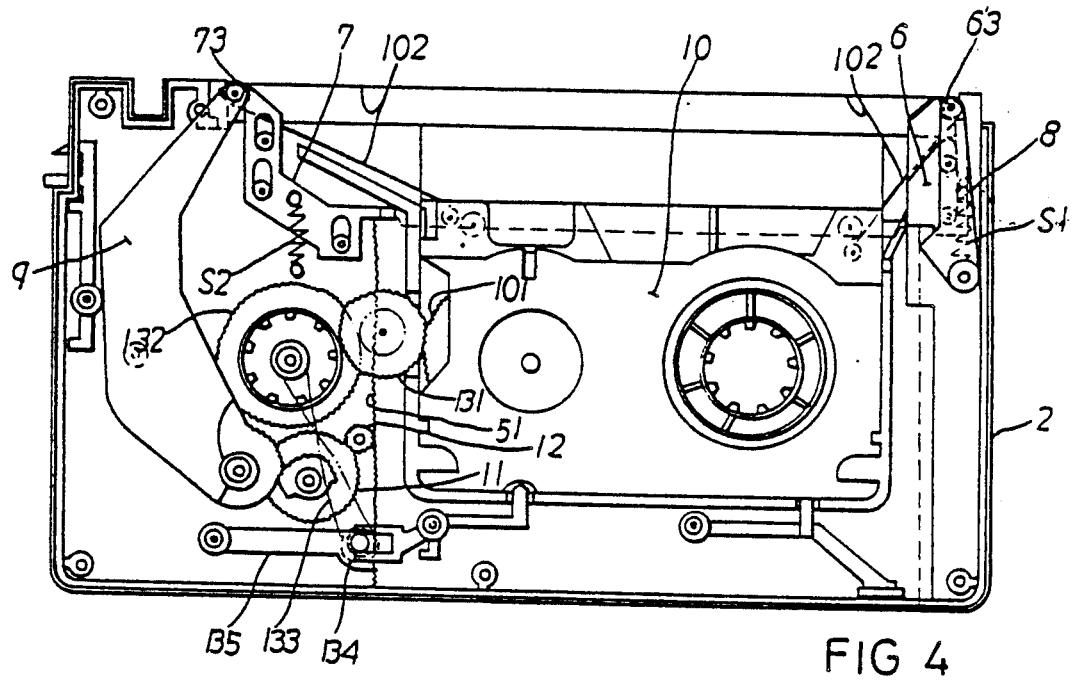
FIG. 4 is a view of the present invention with video tape changing procedure completed.
Figure 5:
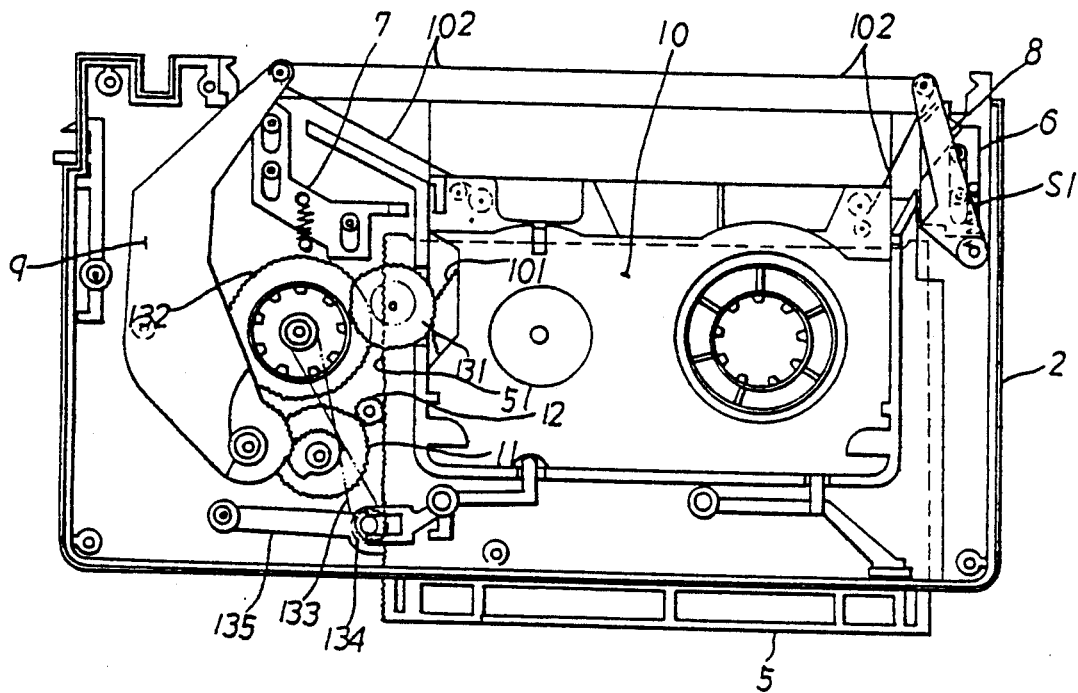
FIG. 5 shows the video tape reversely changing procedure.

According to the above arrangement, when the video tape 10 is placed into the box body 2 through the opening 21 thereof (please refer to FIGS. 2 and 3.) and an inner winding gear 101 of the video tape 10 engages with the second idle gear 131 of the winding means 13 with the tape member 102 riding on the shaft rods 82, 92 of the left and right arm members 8, 9, if the drive cover 5 is moved forward, the rack 51 thereof will simultaneously urge the third drive gear 134 and first idle gear 12 to rotate together. At this time, due to displacement of the drive gear 134, the belt 133 is loosened and makes the winding means unable to rotate normally, while the first idle gear 12 will urge the drive gear 11 to rotate so as to rotate right arm member 9 and make the shaft rod 92 displace the tape member 102. Simultaneously, the drive cover 5 pushes the left arm member 8 and makes the same rotate, whereby the shaft rod 82 displaces the tape member 102. After the left and right arm members 8, 9 reach appropriate positions, they are no longer pushed by the drive cover 5 (as shown in FIG. 3), and at this time the drive cover 5 pushes the left and right fixing blocks 6, 7 forward, making the shaft rods 82, 92 located fixedly into the fixing grooves 63, 73 (as shown in FIG. 4). Therefore, by means of moving the drive cover 5 to close the opening 21, the video tape 10 is also converted to match with a common video tape recorder When taking out the video tape 10, one only needs to move the drive cover 5 backward and the aforesaid procedure is performed in reverse, in which case the third drive gear 134 of the winding means 13 and the clutch rod 135 move backward together to tighten the belt 133 so that when the drive cover 5 moves backward and right arm member 9 returns to its home position, the rack 51 drives the third drive gear 134 as well as the winding means 13 to move the belt 133, and the belt 133 in turn drives the second drive gear 132 to rotate second idle gear 131 for further driving the winding gear 101 (as shown in FIG. 5) so as to wind the tape member 102 into the video tape 10.

I claim:

1. A automatic video tape converting device comprising a box body having an upper opening, a front cap and a bottom cover, said device further comprising a drive cover, a pair of left and right fixing blocks, a pair of left and right arm members, a winding means, a first idle gear, a first drive gear and two extension springs, wherein a pair of corresponding due grooves are formed respectively on two sides of said upper opening for said drive cover to slidably associate therewith, and said drive cover has a rack portion, said first idle gear engaging with said rack portion and also meshing with said first drive gear, said first idle gear and first drive gear being pivoted to said box body, said right arm member being crank-shaped with its one end pivoted to said box body and the other end pivoted on a first shaft rod, said one end of said right arm member having fan tooth portion engaging with said first drive gear, said left arm member having one end pivoted to said box body opposite to said right arm member and an other end pivoted on a second shaft rod, a drive surface being formed on said left arm member, said left and right fixing blocks being respectively located in front of said left and right arm members and fixedly fitted to two pairs of guide posts, said extension springs being disposed to restrict said left and right fixing blocks, permitting the same to move forward and backward, back faces of said left and right fixing blocks being formed with fixing grooves for said first and second shaft rods to be located therein, whereby means of moving said drive cover, said left and right arm members are rotated outwardly to stretch a tape member of a video tape and cause said left and right fixing blocks to fixedly associate with said left and right arm members so that a video tape is automatically converted when mounted into said video tape converting device.

2. A device as claimed in claim 1, wherein said winding means includes a clutch rod member pivoted to said box body at its one end and pivotably connected to a third drive gear engaging with said rack portion of said drive cover at is other end, said third drive gear being adapted to be driven by said rack portion and displaced together with said clutch rod member, said third drive gear further being equipped with a first pulley for a belt associated therewith, said belt being further associated with a second pulley disposed on a second drive gear, said second drive bear being engaged with a second idle gear, whereby when said drive cover moves backward, said rack portion drives said third drive gear and clutch rod member to displace backward and tighten said belt so as to rotate said second drive gear and second idle gear, whereby said second idle gear can drive a winding gear of the video tape to rotate and wind the tape member thereonto.

* * * * *